United States Patent Office 3,705,920
Patented Dec. 12, 1972

3,705,920
SULFONYLPHENYLPHOSPHONIC ACIDS
Arthur A. Patchett, Cranford, N.J., assignor to
Merck & Co., Inc., Rahway, N.J.
No Drawing. Filed Dec. 10, 1969, Ser. No. 883,992
Int. Cl. A61k 27/00; C07f 9/38
U.S. Cl. 260—502.5          8 Claims

ABSTRACT OF THE DISCLOSURE

Sulfonylphenylphosphonic acids and salts, esters and amides thereof wherein the benzene ring may be substituted by halo, alkyl, trihalomethyl, nitro, carboxy or a hydrocarbylene moiety. The products are prepared by treating a sulfonylbenzene diazonium salt with a cuprous halide and a phosphorous trihalide followed by hydrolysis of the resulting intermediate. The products are uricosuric agents useful in the treatment of gout and gouty arthritis.

This invention relates to a new class of chemical compounds which can be described generally as sulfonylphenylphosphonic acids and to the salts, esters and amide derivatives thereof. It is also an object of this invention to describe novel methods for the preparation of the sulfonylphenylphosphonic acids.

Pharmacological studies show that the instant products are effective uricosuric agents which can be used in the treatment of gout and gouty arthritis by increasing the excretion of uric acid by the kidney. The instant products are also a valuable adjuvant for inhibiting excretion of penicillin, thus maintaining high antibiotic levels in the treatment of conditions that require intensive penicillin therapy.

The sulfonylphenylphosphonic acids of this invention are compounds having the following structural formula:

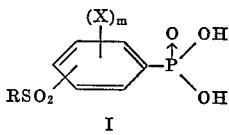

I wherein R is a primary or secondary amino radical of the formula:

wherein $R^1$ is hydrogen, alkyl, for example, lower alkyl such as ethyl, n-propyl, n-butyl, pentyl, hexyl and the like, cycloalkyl, for example, mononuclear cycloalkyl containing from 5 to 6 nuclear carbon atoms such as cyclopentyl, cyclohexyl and the like; $R^2$ is alkyl, for example, lower alkyl such as ethyl, n-propyl, n-butyl, pentyl, hexyl and the like or cycloalkyl, for example, mononuclear cycloalkyl containing from 5 to 6 nuclear carbon atoms such as cyclopentyl, cyclohexyl and the like, and $R^1$ and $R^2$, taken together, may be joined with the nitrogen to which they are attached to form a saturated 5- or 6-membered heterocyclic ring such as 1-pyrrolidinyl, morpholino, piperidino and the like, alkyl, for example, straight or branched chain alkyl containing from 4 to 10 carbon atoms such as n-butyl, 4-heptyl, 1,6-dimethyloctyl and the like, cycloalkyl, for example, mononuclear cycloalkyl containing from 5 to 6 nuclear carbon atoms such as cyclopentyl, cyclohexyl and the like, alkenyl such as 2-butenyl and the like or alkynyl such as 2-butynyl and the like; X is halo, for example, bromo, chloro, fluoro and the like, lower alkyl such as methyl and the like, nitro, trihalomethyl such as trifluoromethyl and the like, or carboxy or two X radicals on adjacent carbon atoms of the benzene ring may be joined to form a hydrocarbylene chain containing from 3 to 4 carbon atoms between their points of attachment, for example, trimethylene, tetramethylene or 1,3-butadienylene (i.e., —CH=CH—CH=CH—) and m is an integer having a value of 0–4 and the non-toxic, pharmaceutically acceptable salts thereof as, for example, the alkali metal and alkaline earth metal salts such as are derived from sodium, calcium, magnesium and the like, or salts of secondary amines such as dialkylamines or heterocyclic amines such as dimethylamine, diethylamine, pyrrolidine, piperidine, pyridine or morpholine and the like.

A preferred embodiment of this invention relates to a di-substituted sulfamoylphenylphosphonic acid having the following structural formula:

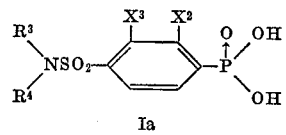

Ia wherein $R^3$ and $R^4$ are lower alkyl and $X^2$ and $X^3$ are hydrogen, halo or trihalomethyl; and the alkali metal or alkaline earth metal salts thereof. This class of compounds represents a preferred subgroup of compounds within the scope of this invention.

The sulfonylphenylphosphonic acids (I, supra) of this invention are conveniently prepared by treating a sulfonylbenzene trihalophosphonium salt (II, infra) with water. Temperature is not a critical aspect of this invention but the application of heat does facilitate the reaction and, therefore, in general, it is most desirable to conduct the reaction with heating as, for example, by heating at temperatures in the range of from about 25° to 100° C. The following equation illustrates this process:

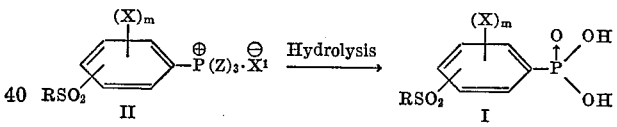

wherein R, X and m are as defined above, $X^1$ is fluoboro, chloro, bromo, fluoro and the like and Z is halo such as chloro, bromo and the like.

The sulfonylbenzene trihalophosphonium salts (II, supra) are prepared by treating the corresponding sulfonylbenzene diazonium salt (III, infra) with a phosphorous trihalide such as phosphoroustrichloride, phosphorous tribromide and the like in the presence of a cuprous halide such as cuprous bromide, cuprous chloride and the like or copper bronze. Any inorganic solvent which is substantially inert to the reactants may be employed, for example, alkyl acetates such as ethyl acetate, isopropyl acetate, n-butyl acetate and the like or ether solvents such as dioxane and the like. Although temperature is not a particularly critical aspect of this invention, it is preferred to conduct the reaction at a temperature in the range of about 5° to about 80° C. The following equation illustrates this process:

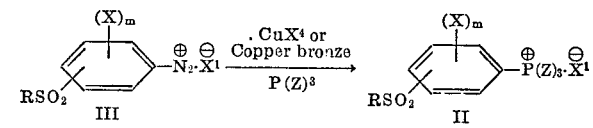

wherein R, X, m, $X^1$, Y and Z are as defined above and $X^4$ is halo such as bromo, chloro and the like.

The sulfonylbenzene diazonium salts (infra) used in the preparation of the sulfonylbenzene trihalophosphonium salts (II, supra) may be prepared by the diaziotization of an appropriate sulfonylaniline (IV, infra). The sulfonylaniline is dissolved in a solution of glacial acetic acid and a strong acid, for example, fluoboric acid, hydrochloric acid, hydrobromic acid and the like and converted to its corresponding diazonium salt by treatment with an aqueous solution of sodium nitrite. The following equation illustrates this process:

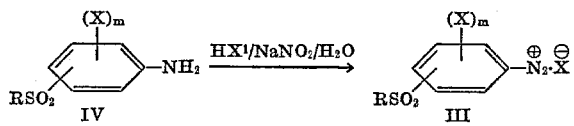

wherein R, X, X¹ and m are as defined above.

The sulfonylbenzene diazonium fluoborates (III, infra) used in the preparation of the sulfonylbenzene trihalophosphonium fluoborate salts (II, supra) may also be prepared by the reaction of a sulfonylbenzene diazonium halide (IIIa, infra) with fluoboric acid or an alkali metal fluoborate salt. The fluoboric acid or fluoborate salt is added to an aqueous solution of the sulfonylbenzene diazonium halides to cause precipitation of the sparingly soluble sulfonylbenzene diazonium fluoborate (III). The following equation illustrates this process:

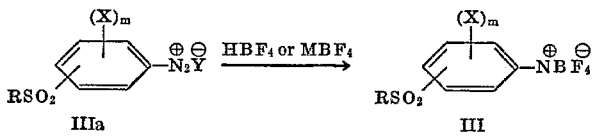

wherein R, X and m are as defined above and Y is halo such as bromo or chloro and M is a cation derived from an alkali metal such as the cation derived from sodium and the like.

The sulfonylanilines (IV, supra) employed as intermediates in the preparation of the sulfonylbenzene diazonium fluoborates (III, supra) and sulfonylbenzene diazonium halides (IIIa, supra) are prepared by hydrolyzing an appropriate N-lower alkanoyl sulfonylaniline (V, infra) with an aqueous solution of an inorganic acid such as hydrochloric acid and the like or, alternatively, with an aqueous solution of a base as, for example, an alkali metal hydroxide such as sodium hydroxide, potassium hydroxide and the like. The following equation illustrates this process:

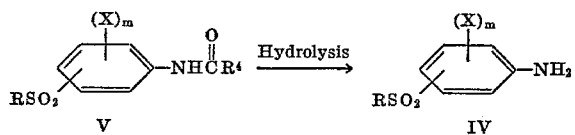

wherein R, X and m are as defined above and R⁴ is lower alkyl such as methyl, ethyl, n-propyl and the like.

The N-lower alkanoyl(sulfonyl)anilines (V) are conveniently prepared by either one of two methods. The method employed is dependent upon the nature of the R group desired in the N-lower alkanoyl(sulfonyl)aniline (IV). One method, wherein R is a primary or secondary amino radical, comprises treating an N-lower alkanamido substituted benzenesulfonylhalide (VI, infra) with a primary or secondary amine. The second method, wherein R is alkyl, cycloalkyl, alkenyl or alkynyl, comprises the oxidation of an N-lower alkanoyl thio(or sulfinyl)aniline (VI, infra).

The first method for preparing the N-loweralkanoyl(sulfonyl)anilines (IVa, infra) wherein R is a primary or secondary amino radical comprises the reaction of an N-lower alkanamidobenzenesulfonyl halide (VI, infra) with a suitable amine of the formula:

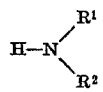

wherein R¹ and R² are as defined above. Any solvent which is substantially inert to the reactants may be employed, for example, acetone, benzene, pyridine and the like; however, it is preferred to use as the solvent an excess of the same amine employed as the starting material in the process. While the temperature at which the reaction is conducted is not critical, it is most desirable to conduct the process at a temperature of from about 25° C. to 100° C. The following equation illustrates this process:

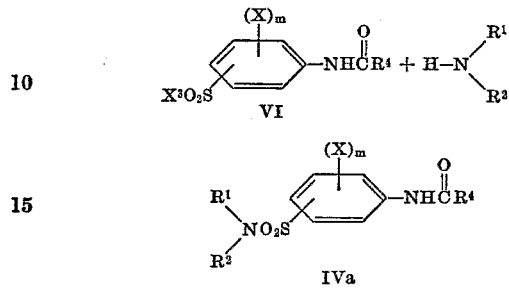

wherein R¹, R², R⁴, X and m are as defined above and X³ is halo such as bromo, chloro and the like.

Those products corresponding to Formula IV, supra, wherein R is alkyl, cycloalkyl, alkenyl or alkynyl are obtained by treating the corresponding N-lower alkanoyl(sulfinyl)aniline (VII, infra) with an oxidizing agent. The following equation illustrates this process:

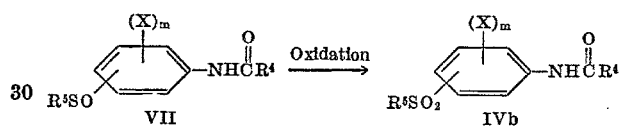

wherein R⁴ and m are as defined above and R⁵ is alkyl, cycloalkyl, alkenyl or alkynyl. Alternatively, in lieu of the n-lower alkanoyl(sulfinyl)aniline precursor (VII) it is also possible to employ as a reactant in this process the corresponding N-lower alkanoyl(thio)aniline (VIII, infra). According to this method of preparattion, the N-lower alkanoyl(thio)aniline reactant (VIII) is first oxidized to the corresponding N-lower alkanoyl(sulfinyl)aniline derivative (VII) and then to the desired N-lower alkanoyl(sulfonyl)aniline (IVb). In practice, when it is desired to isolate the N-lower alkanoyl(sulfinyl)aniline derivative (VII) the N-lower alkanoyl(thio)aniline (VIII) is treated with a stoichiometric amount of oxidizing agent. The N-lower alkanoyl(sulfinyl)aniline thus obtained may then be removed by filtration and, if desired, may be purified by recrystallization from a suitable solvent such as ethanol. The following equation illustrates this two-step process:

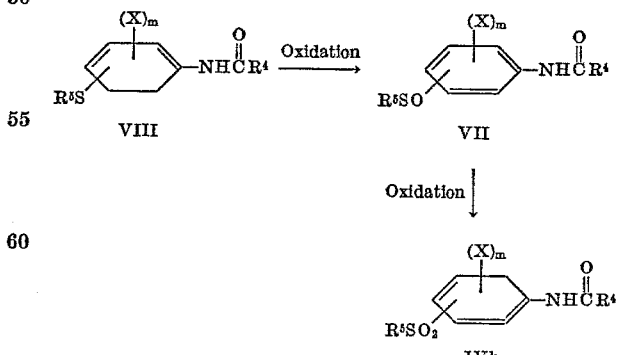

wherein R⁴, R⁵, X and m are as defined above. Oxidizing agents which are suitable for use in both oxidation steps include, for example, hydrogen peroxide, chromium triozide, potassium permanganate and the like. The oxidation reaction may be conducted in any solvent in which the reactants are reasonably soluble and substantially inert. Suitable solvents include acetic acid, acetone and the like. Temperature is not particularly critical to the success of the reaction and, in general, temperatures in the range from about 0° to about 100° C. are suitable;

however, it is usually convenient to conduct the reaction at temperatures in the range from about 0° to room temperature and preferably in an ice bath at about 0° C.

The N-lower alkanoyl(thio)anilines (VII, infra) are conveniently prepared by treating an alkali metal derivative of an N-lower alkanoyl(mercapto)aniline (IX, infra) with a compound of the formula: $X^3R^5$ wherein $R^5$ and $X^3$ are as defined above. Any solvent in which the reactants are soluble and which are inert to the reactants employed may be used, such as ethanol, benzene, toluene, and the like. While the temperature at which the reaction is conducted is not a particularly critical aspect of this invention, we have found it convenient to conduct the reaction at temperatures ranging from ambient temperature up to the reflux temperature of the particular solvent employed. The following equation illustrates this process:

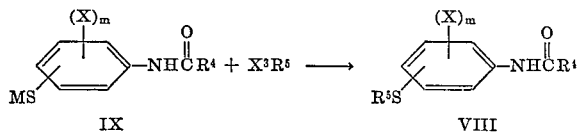

wherein $R^4$, $R^5$, $X$, $X^3$ and $m$ are as defined above and M is a cation derived from an alkali metal such as sodium and the like.

The alkail metal salts of the N-lower alkanoyl-(mercapto)anilines (IX, supra) employed in the preparation of the N-lower alkanoyl(thio)anilines (VIII, supra) are conveniently prepared by treating the corresponding N-lower alkanoyl(mercapto)aniline (X, infra) with a base such as an alkali metal alkoxide or an alkali metal hydride such as sodium ethoxide, sodium hydride and the like. When an alkoxide is employed, we have found it convenient to employ, as a solvent, an alkanol which corresponds to the alkoxide portion of the alkali metal alkoxide, whereas, when an alkali metal hydride is employed hydrocarbon solvents such as benzene, toluene and the like are preferred. This reaction is conveniently conducted at the reflux temperature of the particular solvent employed. The following equation illustrates this process:

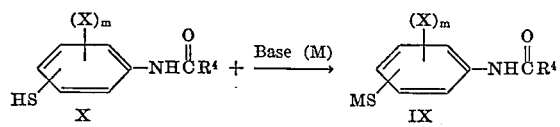

wherein $R^4$, M, X and $m$ are as defined above.

The n-lower alkanoyl(mercapto)anilines (X, supra) employed in the preparation of the alkail metal salts of the N-lower alkanoyl(mercapto)anilines (IX, supra) are either known compounds or are prepared by treating a suitable N-lower alkanamidobenzenesulfonyl halide (VI, infra) with a reducing agent such as zinc amalgam, zinc dust or iron. The reaction is preferably conducted in an aqueous solution of a mineral acid such as hydrochloric acid, sulfuric acid and the like. The following equation illustrates this process:

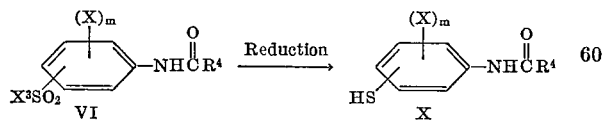

wherein $R^4$, X, $X^3$ and $m$ are as defined above.

The N-lower alkanamido benzenesulfonyl halides (VI, supra) employed as a starting material in the preparation of the N-lower alkanoyl(sulfonyl)anilines (IVa, supra) and in the preparation of N-lower alkanoyl(mercapto)anilines (X) are either known compounds or may be prepared by treating the corresponding anilide (XI, infra) with a halosulfonic acid such as chlorosulfonic acid, fluorosulfonic acid and the like. This reaction is conducted by adding the anilide to the halosulfonic acid at a temperature in the range of from 15° to ambient temperature and when the addition is complete, warming the reaction mixture to complete the reaction. The following equation illustrates this process:

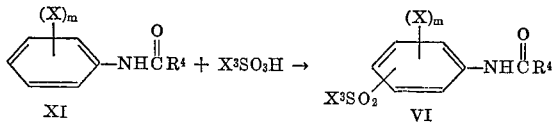

wherein $R^4$, X, $X^3$ and $m$ are as defined above.

Included within the scope of this invention are the non-toxic, pharmaceutically acceptable salts of the instant products. In general, any base which will form a salt with the foregoing mono-substituted or di-substituted sulfamoylphenylphosphonic acids and whose pharmacological properties will not cause an adverse physiological effect when ingested by the body system, i.e., a pharmaceutically acceptable base, is considered as being within the scope of this invention. Suitable bases for preparing the salts include, for example, the alkali metal and alkaline earth metal hydroxide, carbonates and alkoxides, ammonia, secondary amines, for example, a dialkylamine or a heterocyclic amine such as dimethylamine, diethylamine or pyridine and the like.

Also included within this invention are the ester and amide derivatives of the sulfonylphenylphosphonic acids (I, supra). Thus, for example, the ester derivatives are prepared by treating a sulfonylbenzene trihalophosphonium salt with an alcohol as, for example, with a lower alkyl alcohol such as methanol, ethanol and the like, aralkanol, for example, a phenylalkanol such as 2-phenylethanol and the like, a lower alkanamido lower alkanol such as acetamidoethanol and the like. The amide derivatives of the sulfonylphenylphosphonic acids may be prepared by treating the sulfonylbenzene trihalophosphonium salt with ammonia or an appropriate mono- or di-alkylamine such as methylamine, dimethylamine, diethylamine and the like or a heterocyclic amine such as pyridine and the like to produce the corresponding sulfonylphenylphosphoimidic diamide which when treated with water in the presence of an acid is hydrolyzed to the corresponding sulfonylphenylphosphonic diamide.

The examples which follow illustrate the mono-substituted or di-substituted sulfamoylphenylphosphonic acids (I) of this invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

4-(di-n-propylsulfamoyl)phenylphosphonic acid

Step A: N-acetylsulfanilyl chloride.—To a cooled solution (12°–15° C.) of chlorosulfonic acid (290.0 g., 2.49 moles) is slowly added acetanilide (67.5 g., 0.05 mole). After the addition is complete the mixture is heated to 60° C. for two hours. The reaction mixture is poured into 1 kg. of ice. The crude N-acetylsulfanilyl chloride is collected on a suction funnel and washed with water. Recrystallization from benzene affords substantially pure N-acetylsulfanilyl chloride M.P. 149° C.

Step B: $N^1,N^1$-di-n-propylsulfanilamide.—N-acetylsulfanilyl chloride (36.0 g.) is added carefully to a mixture of di-n-propylamine (52.0 g.) in acetone (200 ml.) The reaction is warmed for ½ hour and then the solvent removed to yield $N^4$-acetyl-$N^1,N^1$-di-n-propylsulfanilamide to which is added ethanol (25 ml.) and hydrochloric acid (25 ml.). The resulting solution is heated under reflux for 1½ hours. About ½ of the solvent is removed and then the reaction mixture is cooled and made basic with sodium hydroxide solution to precipitate the crude product which is removed by filtration and recrystallized from a mixture of ether and petroleum ether to afford $N^1,N^1$-di-n-propylsulfanilamide.

Step C: 4-(di-n-propylsulfamoyl)benzene diazonium fluoborate.—A solution of $N^1,N^1$-di-n-propylsulfanilamide (32 g., 0.125 mole) in 55 ml. of fluoboric acid is cooled to about 0° C. This resulted in a thick suspension that is stirred vigorously while a solution of 8.5 g. (0.125 mole) of sodium nitrite in 20 ml. of water is added slowly, dropwise, at such a rate that the temperature remains below 5° C. After the addition is complete, the reaction is stirred for an additional 15 minutes. The reaction mixture is filtered through a sintered glass funnel, the residue is washed with a small amount of cold fluoboric acid and then with alcohol and ether. The residue is then dried in a desiccator over phosphorus pentoxide to afford 31.5 g. of 4-(di-n-propylsulfamoyl)benzene diazonium fluorborate.

Step D: 4 - (di-n-propylsulfamoyl)phenylphosphonic acid.—A suspension of 4-(di-n-propylsulfamoyl)benzene diazonium fluoborate 35.5 g. (0.1 mole) and 2 g. of cuprous bromide in 125 ml. of reagent ethyl acetate and 13.7 g. (0.1 mole) of phosphorus trichloride is stirred whereupon an immediate reaction takes place causing a rapid rise in temperature. The reaction mixture containing 4-(di - n - propylsulfamoyl)benzene trichlorophosphonium fluoborate is cooled just enough to prevent loss of product. Stirring is then continued for 0.5 hour after which 25 ml. of water is added slowly and the reaction mixture subjected to steam distillation until about 500 ml. of distillate is collected. The residual suspension is extracted with ether and the extract dried over sodium sulfate. The sodium sulfate is removed by filtration, the filtrate concentrated to a small volume and is chilled to obtain the product. Purification is accomplished by reprecipitation from a sodium bicarbonate solution of the product by acidification with dilute hydrochloric acid and recrystallization from a mixture of acetone and ether. There is thus obtained about 10 gms. of 4-(di-n-propylsulfamoyl)phenylphosphonic acid, M.P. 171°–173° C.

Elemental analysis for $C_{12}H_{20}NO_5PS$.—Calc. (percent): C, 44.85; H, 6.27; N, 4.36. Found (percent): C, 45.10; H, 6.44; N, 4.29.

EXAMPLE 2

4-di-n-butylsulfamoylphenylphosphonic acid

Step A: $N^1,N^1$-di-n-butylsulfanilamide.—To a chilled solution of di-n-butylamine (70 g.) in pyridine (150 ml.) is added N-acetylsulfanilyl chloride (60 g.) in portions and with good stirring. After the addition is complete, the reaction mixture is warmed on the steam bath for 3 hours. The excess pyridine and dibutyl amine are removed under reduced pressure to yield crude N-acetyl-$N^1,N^1$-di-n-butylsulfanilamide as a thick brown oil. A mixture of ethanol (150 ml.), water (250 ml.) and concentrated hydrochloric acid (250 ml.) is added and the reaction mixture heated on the steam bath for 3 hours. The excess ethanol is removed, the reaction mixture cooled and a 40% solution of sodium hydroxide is added until the reaction mixture is basic. The oil that separates soon crystallizes. Recrystallization from ether-hexane yields 57.8 g. of $N^1,N^1$-di-n-butylsulfanilamide, M.P. 71°–73° C.

Elemental analysis for $C_{14}H_{24}N_2O_2S$.—Calc. (percent): C, 59.12; H, 8.50; N, 9.85. Found (percent): C, 59.09; H, 8.35; N, 9.74.

Step B: 4-(di-n-butylsulfamoyl)benzene diazonium fluoborate.—A solution of $N^1,N^1$-di-n-butylsulfonilamide (0.125 mole) in fluoboric acid (500 ml.) was cooled to about 0°. The resulting suspension was stirred vigorously while adding a solution of sodium nitrite (8.5 g., 0.125 mole) in water (20 ml.) at such a rate that the temperature remained below 5° C. After the addition was complete, the reaction was stirred for an additional 15 minutes. The reaction mixture was then filtered and the residue washed with a small amount of cold fluoboric acid and then with alcohol and ether. The residue was then dried to afford 4-(di-n-butylsulfamoyl)benzene diazonium fluoborate.

Step C: 4 - (di - n - butylsulfamoyl)phenylphosphonic acid.—By substituting for the 4-(di-n-propylsulfamoyl)benzene diazonium fluoborate of Step D, Example 1, an equimolar quantity of 4-(di-n-butylsulfamoyl)benzene diazonium fluoborate and by following substantially the procedure described therein, there is obtained 4-(di-n-butylsulfamoyl)phenylphosphonic acid, M.P. 91°–93° C.

Elemental analysis for $C_{14}H_{24}NO$-PS.—Calc. (percent): C, 48.13; H, 6.92; N, 4.01. Found (percent): C, 47.96; H, 6.84; N, 3.98.

EXAMPLE 3

Disodium 3-chloro-4-(di-n-butylsulfamoyl)phenylphosphonate hydrate

Step A: $N^1,N^1$-di-n-butyl - 2 - chlorosulfanilamide.—2-chloro-N-acetylsulfanilyl chloride (18 g.) is added carefully to a mixture of di-n-butylamine (26 g.) in acetone (100 ml.). The reaction is warmed for ½ hour and then the solvent removed to yield $N^4$-acetyl-$N^1,N^1$-di-n-butyl-2-chlorosulfanilamide to which is added ethanol (25 ml.) and hydrochloric acid (25 ml.). The resulting solution is heated under reflux for 1½ hours. About ½ of the solvent is removed and then the reaction mixture is cooled and made basic with sodium hydroxide solution to precipitate the crude product which is removed by filtration and recrystallized from a mixture of ether and petroleum ether to afford 15.8 g. of $N^1,N^1$-di - n - butyl - 2 - chlorosulfanilamide, M.P. 107°–109° C.

Elemental analysis for $C_{14}H_{23}ClN_2O_2S$.—Calc. (percent): C, 52.73; H, 7.27; N, 8.79. Found (percent): C, 52.80; H, 6.95; N, 8.70.

Step B: 3-chloro-4-(di-n-butylsulfamoyl)benzene diazonium fluoborate.—By substituting for the $N^1,N^1$-di-n-propylsulfanilamide of Example 1, Step C, an equimolar quantity of $N^1,N^1$-di-n-butyl-2-chlorosulfanilamide and by following substantially the procedure described therein, there was obtained 3-chloro-4-(di-n-butylsulfamoyl)benzene diazonium fluoroborate.

Step C: Disodium 3-chloro-4-(di - n - butylsulfamoyl)-phenylphosphonate hydrate.—By substituting for the 4-di-n-propylsulfamoylbenzene diazonium fluoborate of Example 1, Step D, an equimolar quantity of 3-chloro-4-(di-n-butylsulfamoyl)benzene diazonium fluoborate and by following substantially the procedure described therein, there is obtained 3-chloro-4-(di-n-butuylsulfamoyl)phenylphosphonic acid as an oil. The oil is dissolved in water and an aqueous solution of sodium hydroxide is added until the pH of the solution is approximately 8. The bulk of the solvent is then removed under reduced pressure, acetone is added and the solid residue is removed by filtration. Recrystallization is accomplished by suspending the solid in boiling acetone and adding water until solution is achieved. On chilling, the product crystallizes as the hydrate of the disodium salt. Filtration yields disodium 3-chloro-4-(di-n-butylsulfamoyl)phenylphosphonate hydrate.

Elemental analysis for $C_{14}H_{23}ClNNa_2O_6PS$.—Calc. (percent): C, 37.71; H, 5.20; N, 3.14. Found (percent): C, 37.33; H, 5.09; N, 3.02.

EXAMPLE 4

4-di-n-butylsulfamoyl-3-fluorophenylphosphonic acid

Step A: N-acetyl-$N^1,N^1$-di-n - butyl - 2 - fluorosulfanilamide.—3-fluoroacetanilide (153.0 g.) is added to chlorosulfonic acid (330 ml.). After heating at 60°–65° C. for 2 hours the solution is cooled and poured onto crushed ice to yield 56 g. of crude 2-fluoro-N-acetylsulfanilyl chloride which is added to di-n-butylamine (75 g.) in benzene (200 ml.). After heating on the steam bath ½ hour the reaction is cooled and washed with a mixture of water (200 ml.) and concentrated hydrochloric acid (100 ml.). After drying the organic phase over sodium sulfate the drying agent is removed and the solvent removed at reduced pressure to yield 41 g. of crude N-acetyl-$N^1,N^1$-di-n-butyl-2-fluorosulfanilamide, M.P. 70°–72° C. Recrystallization from ether yields pure N-acetyl-$N^1,N^1$-di-n-butyl-2-fluorosulfanilamide, M.P. 72°–74° C.

Elemental analysis for $C_{16}H_{25}FN_2O_3S$.—Calc. (percent): C, 55.79; H, 7.32; N, 8.13. Found (percent): C, 56.30; H, 7.02; N, 8.19.

Step B: $N^1,N^1$-di-n-butyl - 2 - fluorosulfanilamide.—N-acetyl-$N^1,N^1$-di-n-butyl-2-fluorosulfanilamide (40 g.) in hydrochloric acid (150 ml., 6 N) and ethanol (200 ml.) is heated on the steam bath for 3 hours. The reaction mixture is cooled and made basic with a 40% solution of sodium hydroxide to yield 29.5 g. of $N^1,N^1$-di-n-butyl-2-fluorosulfanilamide.

Step C: 4-di-n-butylsulfamoyl-3-fluorobenzene diazonium fluoborate.—By following substantially the procedure as described in Example 1, Step C, and by substituting for the $N^1,N^1$-di-n-propylsulfanilamide recited therein, an equimolar quantity of $N^1,N^1$-di-n-butyl-2-fluorosulfanilamide, there is obtained 4-di-n-butylsulfamoyl-3-fluorobenzene diazonium fluoborate.

Step D: 4-di - n - butylsulfamoyl - 3 - fluorophenylphosphonic acid.—By following substantially the procedure as described in Example 1, Step D, and by substituting for the 4-di-n-butylsulfamoylbenzene diazonium fluoborate an equimolar quantity of 4-di-n-butylsulfamoyl-3-fluorobenzene diazonium fluoborate, there is obtained 4-di-n-butylsulfamoyl-3-fluorophenylphosphonic acid.

EXAMPLE 5

3-trifluoromethyl-4-(di-n-butylsulfamoyl)phenylphosphonic acid

Step A: $N^1,N^1$-di-n - butyl - 2 - trifluoromethylsulfanilamide.—By substituting for the N-acetylsulfanilyl chloride of Example 2, Step A, an equimolar quantity of 2-trifluoromethyl N-acetylsulfanilyl chloride and by following the procedure described therein, there is obtained $N^1,N^1$-di-n-butyl-2-trifluoromethylsulfanilamide.

Step B: 3-trifluoromethyl - 4 - (di - n - butylsulfamoyl) benzene diazonium chloride.—A solution of $N^1,N^1$-di-n-butyl-2-trifluoromethylsulfanilamide in glacial acetic acid and concentrated hydrochloric acid at 0° C. is treated with a solution of sodium nitrite in water to yield 3-trifluoromethyl - 4 - (di - n - butylsulfamoyl)benzene diazonium chloride.

Step C: 3-trifluoromethyl-4-(di-n-butylsulfamoyl)-diazonium fluoroborate.—To a solution of 3-trifluoromethyl-4-(di-n-butylsulfamoyl)benzene diazonium chloride in water at 0° C. is added an ice cold solution of fluoroboric acid in water to yield a precipitate of 3-trifluoromethyl-4-(di - n - butylsulfamoyl)benzene diazonium fluoroborate which is collected and dried.

Step D: 3-trifluoromethyl - 4 - (di - n - butylsulfamoyl) phenylphosphonic acid.—By substituting for the 4-(di-n-propylsulfamoyl)benzene diazonium fluoroborate of Example 1, Step D, an equimolar quantity of 3-trifluoromethyl-4-(di-n-butylsulfamoyl)benzene diazonium fluoroborate and following substantially the procedure described therein, there is obtained 3-trifluoromethyl-4-(di-n-butylsulfamoyl)phenylphosphonic acid.

EXAMPLE 6

3-chloro-4-(4-heptylsulfonyl)phenylphosphonic acid

Step A: N - acetyl - 2 - chlorosulfanilyl chloride.—3-chloroacetanilide (0.1 mole) is slowly added to chlorosulfonic acid (330 ml.). After the addition is completed the reaction mixture is heated to 60°–65° C. for 2 hours, the solution is then cooled and poured onto crushed ice to yield crude N-acetyl-2-chlorosulfanilyl chloride, M.P. 138°–140° C.

Step B: 4-acetamido-2-chlorothiophenol.—Sulfuric acid (300 ml., concd.) is added to cold water (600 ml.) and the solution is cooled to room temperature. A solution of mercuric chloride (28.0 g.) in water (200 ml.) and concentrated hydrochloric acid (20.0 ml.) is prepared. To this solution is added powdered zinc (200.0 g.), with occasional stirring to break up the lumps. The zinc amalgam formed is collected on a suction funnel and washed successively with water, alcohol and ether. A mixture of the zinc amalgam (67.0 g.), N-acetyl-2-chlorosulfanilyl chloride and benzene (300 ml.) is added to the sulfuric acid solution and the mixture is carefully heated under reflux, with good stirring, until the reaction became vigorous. After the initial reaction had subsided, the mixture is heated on the steam bath for 2 hours. The mixture is then cooled and extracted with four 500 ml. portions of ether. The extract is dried over sodium sulfate, filtered and concentrated to a small volume whereupon there is obtained 25 g. of 4-acetamido-2-chlorothiophenol, M.P. 119°–121° C.

Elemental analysis for $C_8H_8ClNOS$.—Calc. (percent): C, 47.64; H, 4.00. Found (percent): C, 48.00; H, 4.80.

Step C: 3 - chloro - 4 - (4-heptylthio)acetanilide.—Sodium (9.2 g., 0.4 g. atom) is dissolved in ethanol (400 ml.). To this solution is added 4-acetamido-2-chlorothiophenol (0.03 ml.), the reaction mixture is then heated under reflux for ½ hour. 4-bromoheptane (59.2 g., 0.33 mole) is added as rapidly as the reaction would allow. The reaction mixture is then heated for 5 hours. The excess ethanol is removed and water is added to the residue. The oily product is extracted into ether. The extract is dried over sodium sulfate. The solution is filtered and the ether is removed to yield 3-chloro-4-(4-heptylthio)acetanilide.

Step D: 3 - chloro - 4-(4-heptylsulfonyl)acetanilide.—A solution of 3-chloro-4-(4-heptylthio)acetanilide (0.0104 mole) in a mixture of glacial acetic acid (125.0 ml.) and acetic anhydride (125.0 ml.) is cooled to 0° C. and 39 g. (0.39 mole) of 30% hydrogen peroxide is added slowly, dropwise, with good stirring at such a rate that the temperature remains below 5° C. The reaction is allowed to come to room temperature as the ice bath melts. After diluting the reaction with a liter of water, the oily material is extracted into ether and the extract dried over sodium sulfate. The sodium sulfate is removed by filtration and the ether removed to afford 3-chloro-4-(4-heptylsulfonyl)acetanilide M.P. 95°–97° C. after several recrystallizations from ether.

Step E: 3 - chloro - 4 - (4-heptylsulfonyl)aniline.—A solution of 3 - chloro - 4-(4-hepthylsulfonyl)acetanilide (45.0 g. in ethanol (150 ml.), concentrated hydrochloric acid (100 ml.) and water 100 ml.) is heated under reflux for 48 hours. After concentrating to a small volume on the steam bath, the reaction mixture is diluted to about 2 liters with cold water to afford 3-chloro-4-(4-heptylsulfonyl)-aniline, M.P. 178°–180° C.

Step F: 3-chloro-4-(4-heptylsulfonyl)benzene diazonium fluoborate.—By substituting for the $N^1,N^1$-di-n-propylsulfanilamide of Example 1, Step C, an equimolar quantity of 3-chloro-4-(4-heptylsulfonyl)aniline and following the procedure described therein, there is obtained 3-chloro-4-(4-heptyqlsulfonyl)benzene diazonium fluoborate.

Step G: 3-chloro-4-(4-heptylsulfonyl)phenylphosphonic acid.—By substituting for the 4-(di-n-propylsulfamoyl) benzene diazonium fluoborate of Example 1, Step D, an equimolar quantity of 3-chloro-4-(4-heptylsulfonyl) benzene diazonium fluoborate and following substantially the procedure described therein, there is obtained 3-chloro-4-(4-heptylsulfonyl)phenylphosphonic acid.

EXAMPLE 7

Diethyl 4-(di-n-propylsulfamoyl)phenylphosphonate

To 4 - (di - n-propylsulfamoyl)benzene trichlorophosphonium fluoroborate (0.01 mole) is slowly added absolute ethanol (0.05 mole). The reaction mixture is then brought to reflux for ½ hour and the solvent removed to afford diethyl 4-(di-n-propylsulfamoyl)phenylphosphonate.

EXAMPLE 8

4-(di-n-propylsulfamoyl)phenylphosphonic acid tetramethyl diamide

Dimethylamine (0.4 mole) is added slowly to 4-(di-n-propylsulfamoyl)benzene trichlorophosphonium fluoborate (0.1 mole). The reaction mixture is gently refluxed and the excess dimethylamine is then removed under reduced pressure. Water is added to the residue and the reaction mixture is extracted with ether. The ether solution is dried over sodium sulfate, filtered and the ether removed to afford 4-(di-n-propylsulfamoyl)phenylphosphonic acid tetramethyl diamide.

In a manner similar to that described in Examples 6 and 7 all of the sulfonylphenylphosphonic acids of this invention may be obtained. Thus, by substituting the appropriately substituted acetanilid for the acetanilid of Example 1, Step A, and following substantially the procedure described in Steps A through D of that example, the mono- or di-substituted sulfamoylphenylphosphonic acids of this invention may be obtained. The follownig equation illustrates the reaction of Example 1, Steps A through D, and, together with Table I, infra, depict the mono-substituted and disubstituted sulfamoylphenylphosphonic acid products obtained thereby:

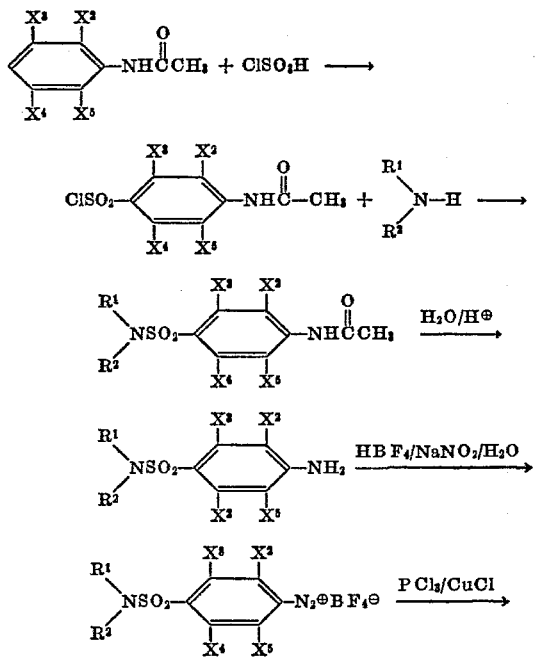

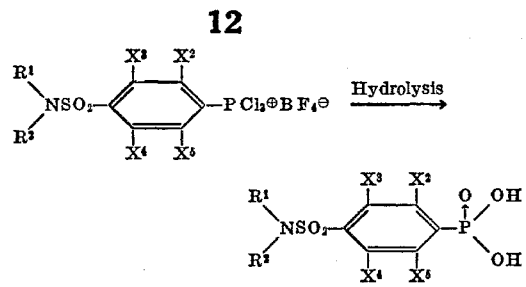

TABLE I

| Ex. No. | R¹ | R² | X³ | X² | X⁴ | X⁵ |
|---|---|---|---|---|---|---|
| 9 | —C₂H₅ | n—C₄H₉ | Cl | Cl | H | H |
| 10 | n—C₄H₉ | n—C₄H₉ | —CH=CH—CH=CH— | | H | H |
| 11 | ⟨S⟩ | ⟨S⟩ | —CH₂CH₂CH₂— | | H | H |
| 12 | H | ⟨S⟩ | —CH₂CH₂CH₂CH₂— | | H | H |
| 13 | n—C₆H₁₃ | n—C₆H₁₃ | —CN | H | H | H |
| 14 | n—C₄H₉ | n—C₃H₇ | Cl | Cl | Cl | H |
| 15 | n—C₃H₇ | n—C₃H₇ | —CO₂H | H | Cl | H |
| 16 | n—C₅H₁₁ | n—C₅H₁₁ | —CF₃ | H | H | H |
| 17 | —CH₂CH₂CH₂CH₂— | | Cl | H | H | H |
| 18 | —CH₂CH₂CH₂CH₂CH₂— | | Cl | H | H | H |
| 19 | n—C₄H₉ | n—C₄H₉ | —NO₂ | —NO₂ | H | H |
| 20 | —CH₂CH₂OCH₂CH₂— | | F | H | H | H |

In a manner similar to that described in Example 6 for the preparation of 3-chloro-4-(4-heptylsulfonyl)phenylphosphonic acid, the sulfonylphenylphosphonic acids of this invention, wherein the substituent on the sulfonyl radical is alkyl, cycloalkyl, alkenyl and alkynyl, may be obtained by substituting the appropriately substituted acetanilide for the 3-chloroacetanilide of Example 6, Step A, and following substantially the procedure described in Steps A through G of that example. The following equation illustrates the reaction of Example 6, Steps A through G, and together with Table II, infra, depict the manner in which the products of Table II are obtained:

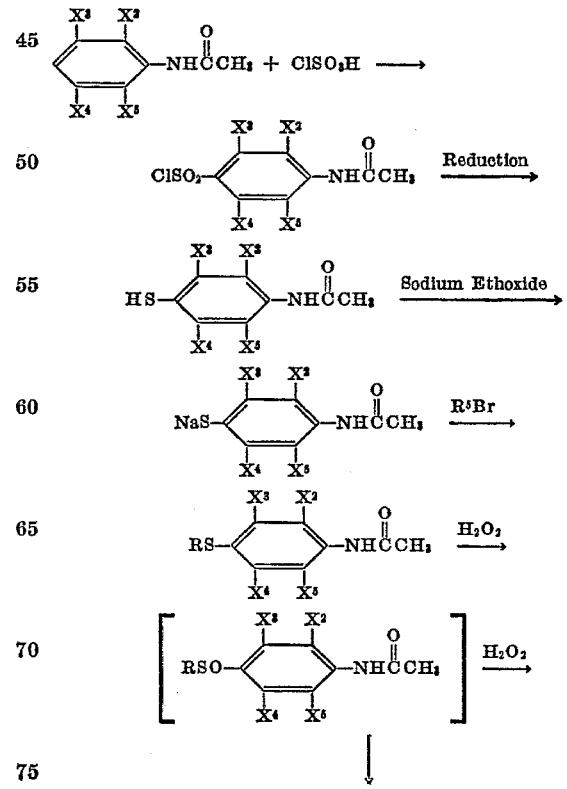

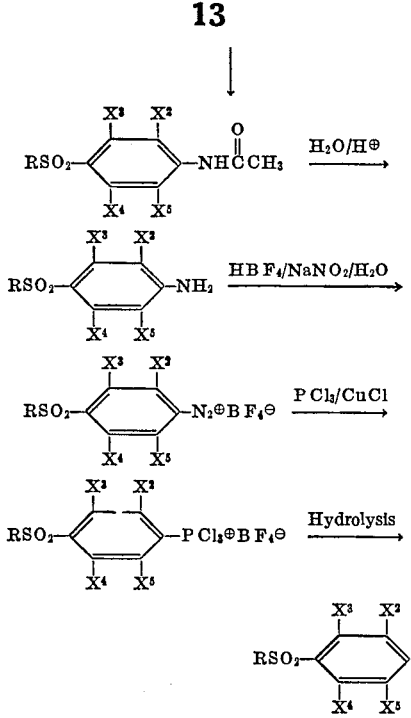

TABLE II

| Ex, No. | R | X² | X³ | X⁴ | X⁵ |
|---|---|---|---|---|---|
| 21 | -C₆H₄S- (phenyl-S) | H | Cl | H | H |
| 22 | -C₄H₃S- (thienyl) | H | CF₃ | H | H |
| 23 | —CH₂CH=CHCH₃ | H | H | H | H |
| 24 | —CH₂C≡CCH₃ | H | Cl | Cl | H |
| 25 | —n-C₄H₉ | H | H | H | H |
| 26 | —(CH₂)₂—CH(CH₃)₂CH(CH₃)₂ with CH₃ | H | H | H | H |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredients for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of 4-(di-n-butylsulfamoyl)phenylphosphonic acid or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 27

Dry-filled capsules containing 50 mg. of active ingredient per capsule

|  | Per capsule, mg. |
|---|---|
| 4-(di-n-butylsulfamoyl)phenylphosphonic acid | 50 |
| Lactose | 149 |
| Magnesium stearate | 1 |
| Capsule (size No. 1) | 200 |

The 4-(di-n-butylsulfamoyl)phenylphosphonic acid is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the sulfonylphenylphosphonic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

I claim:

1. A compound of the formula:

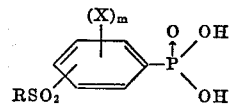

wherein R is a primary or secondary amino radical of the formula:

wherein $R^1$ is hydrogen, alkyl or cycloalkyl; $R^2$ is alkyl or cycloalkyl; X is halo or trihalomethyl and $m$ is an integer having a value of 0–4 or a salt thereof with a pharmaceutically acceptable base.

2. Compounds of the formula:

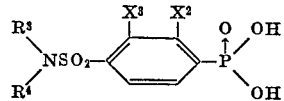

wherein $R^3$ and $R^4$ are lower alkyl and $X^2$ and $X^3$ are hydrogen, halo or trihalomethyl or a salt thereof with a pharmaceutically acceptable base.

3. A compound according to claim 2 wherein $R^3$ and $R^4$ are lower alkyl; $X^3$ is halo and $X^2$ is hydrogen.

4. A compound according to claim 2 wherein $R^3$ and $R^4$ are lower alkyl and $X^2$ and $X^3$ are hydrogen.

5. A compound according to claim 2 wherein $R^3$ and $R^4$ are lower alkyl; $X^3$ is trihalomethyl and $X^2$ is hydrogen.

6. A compound according to claim 3 wherein $R^3$ and $R^4$ are n-butyl; $X^3$ is chloro and $X^2$ is hydrogen.

7. A compound according to claim 4 wherein $R^3$ and $R^4$ are n-butyl; $X^3$ and $X^2$ are hydrogen.

8. A compound according to claim 5 wherein $R^3$ and $R^4$ are n-butyl; $X^3$ is trifluoromethyl and $X^2$ is hydrogen.

References Cited

UNITED STATES PATENTS

| | | | |
|---|---|---|---|
| 2,245,539 | 6/1941 | Warnat | 260—502.5 |
| 2,904,588 | 9/1959 | Smith | 260—502.4 R |

OTHER REFERENCES

Houben-Weyl: "Methoden der Organischen Chemie," Vierte Auflage, December 1, p. 366, 1963.

Doak et al.: J. Am. Chem. Soc., vol. 73, 1951, pp. 5658–5660.

Bost et al.: "J. Org. Chem.," vol. 18 (1953), pp. 362–366.

BERNARD HELFIN, Primary Examiner

J. E. EVANS, Assistant Examiner

U.S. Cl. X.R.

424—215; 260—247.1, 293.73, 326.82, 501.21, 502.4 R, 543 P, 556 AR, 562 R, 578, 947